United States Patent
Kushkuley et al.

(10) Patent No.: US 10,789,293 B2
(45) Date of Patent: Sep. 29, 2020

(54) AUTOMATIC SEARCH DICTIONARY AND USER INTERFACES

(71) Applicant: salesforce.com, Inc., San Francisco, CA (US)

(72) Inventors: Alexander Kushkuley, Ashland, MA (US); Bharath K. Krishnan, Lexington, MA (US)

(73) Assignee: salesforce.com, inc., San Francisco, CA (US)

( * ) Notice: Subject to any disclaimer, the term of this patent is extended or adjusted under 35 U.S.C. 154(b) by 398 days.

(21) Appl. No.: 15/905,127

(22) Filed: Feb. 26, 2018

(65) Prior Publication Data

US 2019/0138659 A1    May 9, 2019

Related U.S. Application Data

(60) Provisional application No. 62/581,474, filed on Nov. 3, 2017.

(51) Int. Cl.
*G06F 16/00* (2019.01)
*G06F 16/901* (2019.01)
(Continued)

(52) U.S. Cl.
CPC ...... *G06F 16/9017* (2019.01); *G06F 16/3338* (2019.01); *G06F 16/36* (2019.01); *G06F 16/9038* (2019.01); *G06F 16/9535* (2019.01)

(58) Field of Classification Search
CPC .. G06F 16/9017; G06F 16/36; G06F 16/3338; G06F 16/9535; G06F 16/9038;
(Continued)

(56) References Cited

U.S. PATENT DOCUMENTS 8,423,349 B1 *  4/2013  Huynh ............... G06F 40/56
                                                     704/9
8,473,293 B1 *  6/2013  Mengibar ........... G10L 15/06
                                                     704/10
(Continued)

FOREIGN PATENT DOCUMENTS

WO    2017/069731 A1    4/2017

OTHER PUBLICATIONS

[No Author Listed], fastText, "Library for efficient text classification and representation learning," (website) <https://fasttext.cc/>, Facebook Open Source, ©Facebook, Inc. 2018.
(Continued)

*Primary Examiner* — Noosha Arjomandi
(74) *Attorney, Agent, or Firm* — Butzel Long

(57) ABSTRACT

A method of filtering content from a data set includes accepting a search request directed to a data set associated with a site, the search request including a search term that is not among terms represented in a site-specific lookup table representing site-specific relatedness of terms in that data set, such related terms including any of synonyms, hypernyms and hyponyms; generating an approximating lookup table by applying a transformation function to a corpus lookup table, the corpus lookup table representing relatedness, in a general corpus, of terms in the data set; identifying terms represented in the approximating lookup table that are related terms of the search term; and filtering from the data set digital content that includes any of the search term and the terms identified from the approximating table as related terms of the search term.

13 Claims, 4 Drawing Sheets

(51) Int. Cl.
*G06F 16/33* (2019.01)
*G06F 16/36* (2019.01)
*G06F 16/9038* (2019.01)
*G06F 16/9535* (2019.01)

(58) Field of Classification Search
CPC .... G06F 16/156; G06F 16/248; G06F 16/338; G06F 16/438; G06F 16/638; G06F 16/738; G06F 16/838
See application file for complete search history.

(56) References Cited

U.S. PATENT DOCUMENTS

| | | | | |
|---|---|---|---|---|
| 8,732,185 | B1* | 5/2014 | Lynn | G06Q 30/0241 707/750 |
| 8,943,060 | B2 | 1/2015 | Krishnan et al. | |
| 9,143,541 | B1* | 9/2015 | Szamonek | H04L 65/403 |
| 10,372,704 | B2* | 8/2019 | Byrnes | G06F 16/435 |
| 2005/0097438 | A1* | 5/2005 | Jacobson | G06F 40/186 715/202 |
| 2010/0169361 | A1* | 7/2010 | Chen | G06F 16/36 707/769 |
| 2011/0004595 | A1* | 1/2011 | Yamagishi | G06Q 50/22 707/739 |
| 2011/0270820 | A1* | 11/2011 | Agarwal | G06F 40/253 707/709 |
| 2012/0185497 | A1* | 7/2012 | Doganata | G06F 16/9535 707/765 |
| 2012/0190404 | A1* | 7/2012 | Rhoads | H04N 5/23219 455/556.1 |
| 2012/0239606 | A1* | 9/2012 | Heidasch | G06Q 10/00 706/55 |
| 2012/0291071 | A1* | 11/2012 | Seo | H04N 21/6175 725/41 |
| 2012/0323932 | A1* | 12/2012 | Xin | G06F 16/367 707/749 |
| 2013/0166303 | A1* | 6/2013 | Chang | G06F 16/7834 704/258 |
| 2014/0007038 | A1* | 1/2014 | Wong | G06Q 10/06 717/101 |
| 2014/0257935 | A1* | 9/2014 | Killoh | G06Q 30/0283 705/7.35 |
| 2015/0019559 | A1* | 1/2015 | Maquaire | G06F 16/907 707/740 |
| 2016/0012056 | A1* | 1/2016 | Smyros | G06F 16/2272 707/728 |
| 2016/0132572 | A1* | 5/2016 | Chang | G06F 16/116 707/723 |
| 2016/0196340 | A1* | 7/2016 | Cheslow | G06F 16/243 707/728 |
| 2017/0091289 | A1* | 3/2017 | Ohazulike | G06F 40/279 |
| 2017/0109807 | A1 | 4/2017 | Krishnan et al. | |
| 2017/0154055 | A1* | 6/2017 | Dimson | G06F 16/5838 |
| 2017/0264960 | A1* | 9/2017 | Stoller | H04N 21/26275 |
| 2017/0270180 | A1* | 9/2017 | State | G06F 16/285 |
| 2018/0081874 | A1* | 3/2018 | Zelenkov | G06F 40/284 |
| 2018/0268053 | A1* | 9/2018 | Tata | G06F 40/247 |
| 2019/0057143 | A1* | 2/2019 | Porter | G06F 16/285 |

OTHER PUBLICATIONS

Goldberg, Y. et al., "word2vec Explained: Deriving Mikolov et al.'s Negative-Sampling Word-Embedding Method," arXiv:1402.3722v1 [cs.CL] Feb. 15, 2014.

Pennington, J., et al., "GloVe: Global Vectors for Word Representation," Proc. 2014 Conf. on Empirical Methods in Natural Language Processing (EMNLP), Oct. 25-29, 2014, pp. 1532-1543.

European Patent Office Communication pursuant to Article 94(3) EPC for App No. EP18204266.3, dated Apr. 24. 2020, 12 pages.

European Search Report for Application No. 18204266.3, dated Jan. 25, 2019 (11 pages).

Gauch, S. et al., "A corpus analysis approach for automatic query expansion and its extension to multiple databases," ACM Transactions on Information Systems, Association for Computing Machinery, vol. 17, No. 3, Jul. 1999 (Jul. 1999), pp. 250-269.

* cited by examiner

AUTOMATIC SEARCH DICTIONARY AND USER INTERFACES

This application claims the benefit of filing of U.S. Patent Application Ser. No. 62/581,474, filed Nov. 3, 2017, the teachings of which are incorporated herein by reference.

BACKGROUND

This relates to digital data processing and, more particularly, to the automated and semi-automated searching and/or updating of data sets using digital dictionaries. It has application, by way of non-limiting example, in improving searching of product databases and other data sets on websites.

Typically, a website's search dictionary lists sets of terms that are used by the site's search engine to identify terms related to those entered by a user in a search query. This allows the search engine to align the search request with terms used in the site databases and, therefore, to better insure inclusiveness of database content presented in response to the search, e.g., per wishes of the site owner or operator.

Defining and keeping search dictionaries up to date is currently an onerous manual task for website owners/operators. They have to trawl through search logs looking for search keywords that resulted in null or sub-optimal search results and link the searched-for words or phrases with terms already in the dictionary.

BRIEF DESCRIPTION OF THE DRAWINGS

A more complete understanding of the discussion that follows may be attained by reference to the drawings, in which.

DETAILED DESCRIPTION OF THE ILLUSTRATED EMBODIMENT

Architecture

Figure 1:
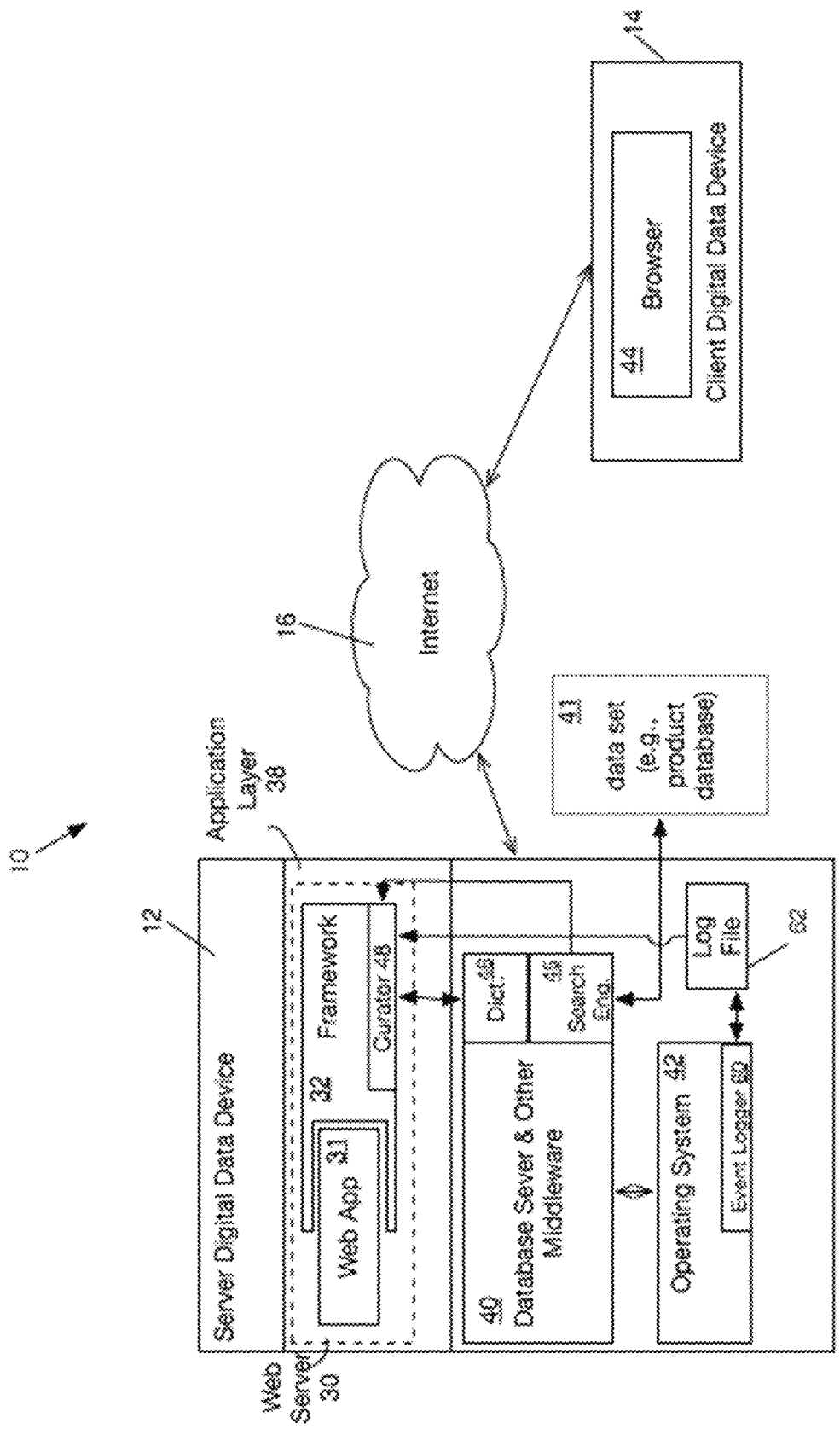
FIG. 1 is an illustrative embodiment and an environment in which it is employed.

FIG. 1 depicts a digital data processing system 10 that includes a server digital data device ("server") 12 coupled to a client digital data device ("client") 14 via a network 16. Devices 12, 14 comprise conventional desktop computers, workstations, minicomputers, laptop computers, tablet computers, PDAs, mobile phones or other digital data devices of the type commercially available in the marketplace, all as adapted in accord with the teachings hereof. Thus, each comprises central processing, memory, and input/output subsections (not shown here) of the type known in the art and suitable for (i) executing software of the type known in the art (e.g., applications software, operating systems, and/or middleware, as applicable) as adapted in accord with the teachings hereof and (ii) communicating over network 16 to one or more of the other devices 12, 14 in the conventional manner known in the art as adapted in accord with the teachings hereof.

Examples of such software include web server 30 that executes on device 12 and that responds to requests in HTTP or other protocols for transferring web pages, downloads and other digital content to a requesting device, e.g., client 14, over network 16, in the conventional manner known in the art as adapted in accord with the teachings hereof. The web server 30 can also respond to search requests in such and other protocols for searching data bases and other data sets associated with a website served by device 12 and, more particularly, by web server 30, all in the conventional manner known in the art as adapted in accord with the teachings hereof.

In the illustrated embodiment, web server 30 comprises web application 31 executing on device 12 within and/or in connection with a web application framework 32. Web application 31 comprises conventional such software known in the art as adapted in accord with the teachings hereof for effecting specific behavior by the server 12 in response to requests from the client 14 at the behest of users thereof. Web framework 32 comprises conventional such software known in the art (as adapted in accord with the teachings hereof) providing libraries and other reusable services that are (or can be) employed—e.g., via an applications program interface (API) or otherwise—by multiple and/or a variety of web applications, one of which is shown here (to wit, web application 31).

In the illustrated embodiment, web server 30 and its constituent components, web application 31, web application framework 32 and curator 48, execute within an application layer 38 of the server architecture. That layer 38, which provides services and supports communications protocols in the conventional manner known in the art as adapted in accord with the teachings hereof, can be distinct from other layers in the server architecture—layers that provide services and, more generally, resources (a/k/a "server resources") that are required by the web application 31 and/or framework 32 in order to process at least some of the requests received by server 30 from client 14.

Those other layers include, for example, a data layer (which provides services supporting interaction with a database server 40 or other middleware in the conventional manner known in the art as adapted in accord with the teachings hereof) and the server's operating system 42 (which manages the server hardware and software resources and provides common services for software executing thereon in the conventional manner known in the art as adapted in accord with the teachings hereof). Other embodiments may utilize an architecture with a greater or lesser number of layers and/or with layers providing different respective functionalities than those illustrated and discussed here.

Digital data processor 12 and, more particularly, by way of example, operating system 42, provides an event logger 60 of the type known in the art that logs to file 62 event entries messaged by the operating system 42 and/or other software executing on the device 12. This can be event-logging functionality native to the operating system such as syslog and/or other event-logging functionality provided by middleware or other software (e.g., web application 24) executing on the device 12, all as per convention in the art and as adapted in accord with the teachings hereof.

In the illustrated embodiment, the data layer supports accessing a site-specific data set 41 maintained on and/or otherwise in communications coupling with the device 12, all in the conventional manner known in the art as adapted in accord with the teachings hereof. That data set 41 can be, for example, a product database of the type maintained by an online retailer, a database of publications of the type maintained by an online library or publisher, a collection of postings of the type maintained on a social network, or other searchable data set, all by way of non-limiting example. Although only one data set 41 is shown in the drawing, in some embodiments (as discussed below), the server 12 and, more particularly, the data layer may support accessing multiple data sets, each associated with a respective website served by web server 30.

Though described herein in the context of a web server 30, in other embodiments, software 31 and 32 may define other functionality suitable for responding to user search, download and other requests, e.g., a video server, a music server, or otherwise. And, though shown and discussed here as comprising web application 31 and web framework 32, in other embodiments, the web server 30 may combine the functionality of illustrated components 31 and 32 in a single component or distribute it among still more components.

With continued reference to FIG. 1, client device 14 of the illustrated embodiment executes a web browser 44 that (typically) operates under user control to generate requests in HTTP or other protocols, e.g., to download pages, to search for content, to present to the user information returned to browser 44 by web server 30, and so forth, and to transmit those requests to web server 30 over network 14—all in the conventional manner known in the art as adapted in accord with the teachings hereof. Though referred to here as a web browser, in other embodiments application 44 may comprise other functionality suitable for transmitting requests to a server 30 and/or presenting content received therefrom in response to those requests, e.g., a video player application, a music player application or otherwise.

The devices 12, 14 of the illustrated embodiment may be of the same type, though, more typically, they constitute a mix of devices of differing types. And, although only a single server digital data device 12 is depicted and described here, it will be appreciated that other embodiments may utilize a greater number of these devices, homogeneous, heterogeneous or otherwise, networked or otherwise, to perform the functions ascribed hereto to web server 30 and/or digital data processor 12. Likewise, although one client device 14 is shown, it will be appreciated that other embodiments may utilize a greater or lesser number of those devices, homogeneous, heterogeneous or otherwise, running applications (e.g., 44) that are, themselves, as noted above, homogeneous, heterogeneous or otherwise. Moreover, one or more of devices 12, 14 may be configured as and/or to provide a database system (including, for example, a multi-tenant database system) or other system or environment; and, although shown here in a client-server architecture, the devices 12, 14 may be arranged to interrelate in a peer-to-peer, client-server or other protocol consistent with the teachings hereof.

Network 14 comprises one or more networks suitable for supporting communications between server 12 and client device 14. The network comprises one or more arrangements of the type known in the art, e.g., local area networks (LANs), wide area networks (WANs), metropolitan area networks (MANs), and or Internet(s).

Search Engine and Site-Specific Dictionaries

Server 12 can additionally support—through search engine 45 provided within the data layer, the application layer 38, the web server 30, a combination of the foregoing, or otherwise—searching the data set 41 to identify items of data meeting specified criteria, e.g., items containing specified terms or synonyms, hyponyms and/or hypernyms thereof and/or related thereto (collectively, "related terms") as specified in a dictionary 46. This can be in response to a call (or other invocation) made by web server 30 or otherwise, e.g., in response to a search request initiated by a user of browser 44 or otherwise. The search engine 45 and dictionary 46 are of the types known in the art as adapted in accord with the teachings hereof. The items of data found by the search engine 45, which can be web pages, records, files, or otherwise, per dictates of the data set, web application 31, or otherwise, can be passed by engine 45 directly or indirectly to the web server 30 or otherwise, e.g., for presentation to a user who made the request via browser 44, all as per convention in the art as adapted in accord with the teachings hereof.

Although in some embodiments, the server digital data device 12 and its constituent components, e.g., framework 32, database layer, operating system, search engine 45, and so forth, may support a single website and data set 41, in embodiments that utilize, for example, a multi-tenancy architecture, they may support multiple websites. Regardless, the server 12 of the illustrated embodiment maintains dictionary 46 and, typically, data set 41 on a per-site basis; hence, the references herein to these as site-specific dictionary and site-specific data set. This may be accomplished physically or logically as per convention in the art or otherwise, and it insures that terms used in searches of the data set 41 for a given website align with terminology used in that data set 41 in a manner that can be controlled by the owner/operator of the site. For example, the owner/operator of a casual clothing website may define "khakis," "jeans," and "shorts" as related words (e.g., synonyms or hyponyms) in the dictionary 46 for that site so that, for example, searches of its data set 41 for khakis additionally returns web pages for jeans and summer shorts but not those for slacks, yet, the owner/operator of a business clothing website may populate its dictionary 46 do define "khakis" and "slacks" as related so that, for example, searches of its data set 41 for khakis additionally returns web pages for dress slacks but not jeans or summer shorts.

In addition to passing search results to the web server 30, or otherwise, the engine 45 can generate and message logger 60 in connection with each search. Such messaging can include the searched-for terms, related terms thereto found in dictionary 46 and incorporated into the search by engine 45, and the number of "hits" in data set 41 resulting from the search, all in the conventional manner known in the art as adapted in accord with the teachings hereof.

Dictionary curation software 48 is provided in the illustrated embodiment to facilitate updating the dictionary 46 automatically or semi-automatically, e.g., based on input of the website owner/operator. Communications between the curator 48 and such owner/operator can be effected via a command line, via a graphical user interface, e.g., via browser 44 on client 14, or otherwise, as per convention in the art as adapted in accord with the teachings hereof. Operation of that "curator" 38, which may form part of the application layer 38, or otherwise is discussed below. Its implementation is within the ken of those skilled in the art in view of the teachings hereof.

Other embodiments may utilize alternate architectures for supporting access to and searching of the data set 41 without deviating from the teachings hereof. Thus, by way of non-limiting example, the search engine 45 and/or dictionary can form part of the application layer 38 or otherwise.

As those skilled in the art will appreciate, the "software" referred to herein—including, by way of non-limiting example, web server 30 and its constituent components, web application 31 and web application framework 32, browser 44, search engine 45, curator 48, and so forth—comprise computer programs (i.e., sets of computer instructions) stored on transitory and non-transitory machine-readable media of the type known in the art as adapted in accord with the teachings hereof, which computer programs cause the respective digital data devices, e.g., 12, 14 to perform the respective operations and functions attributed thereto herein. Such machine-readable media can include, by way of non-limiting example, hard drives, solid state drives, and so forth, coupled to the respective digital data devices 12, 14 in the conventional manner known in the art as adapted in accord with the teachings hereof.

Dictionary Tables

Figure 2:
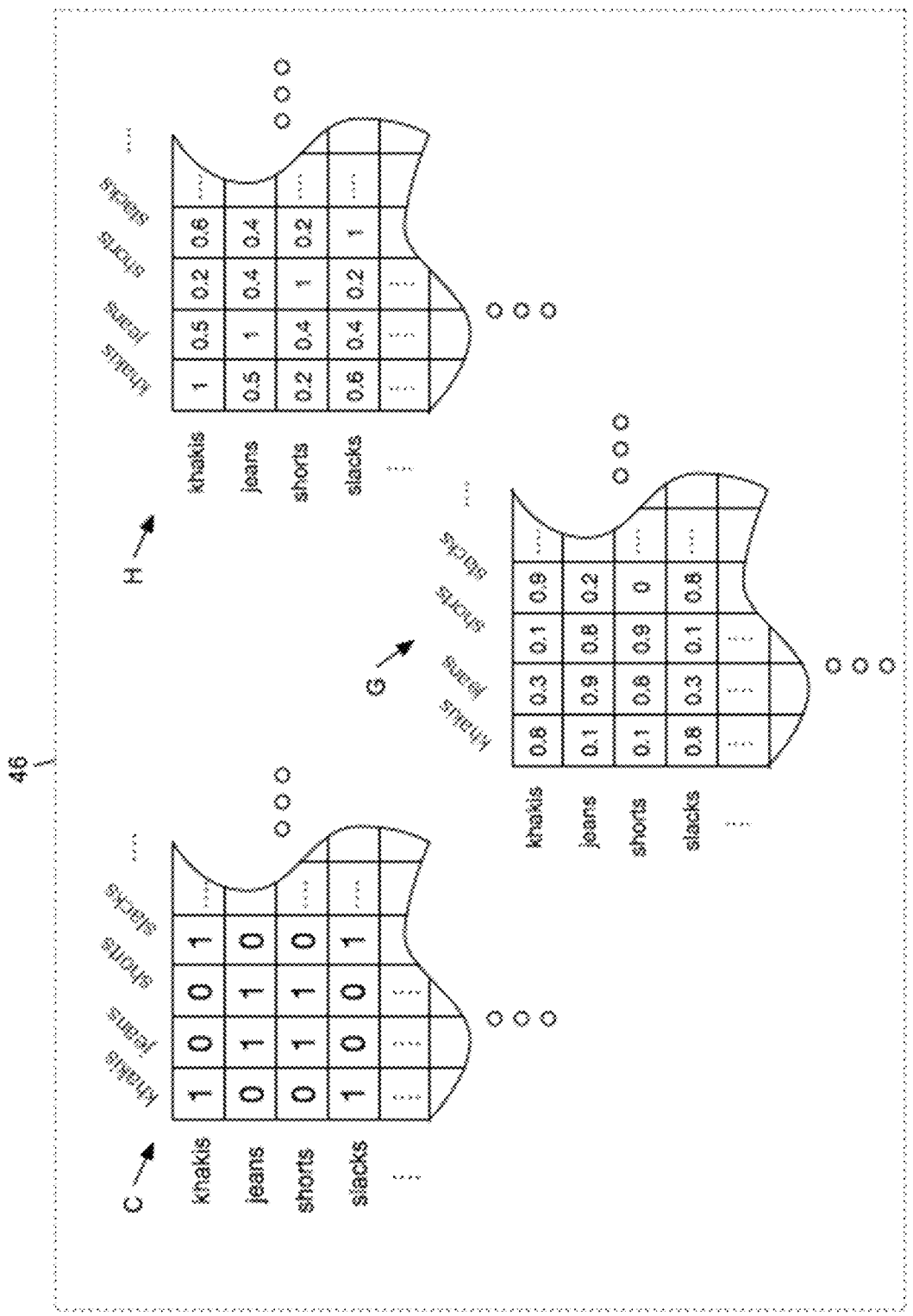
FIG. 2 depicts dictionary tables used in the embodiment of FIG. 1.

FIG. 2 depicts tables forming each site-specific dictionary 46 of the illustrated embodiment to facilitate searches by engine 45 of the data set 41 of that site. The tables include a site-specific lookup table C, a corpus lookup table H and an approximating look-up table G, as well as one or more temporary versions of the foregoing. Their creation, updating and operation is within the ken of those skilled in the art in view of the teachings hereof. Although in the illustrated embodiment, the tables are maintained local to the server 12, in other embodiments they may be maintained remotely.

Site-specific lookup table C maintains a list of searchable terms in the site data set 41 and their related terms (as defined above). As shown in the drawing, table C is a matrix that has search terms as its indices (e.g., its row and column headings) and that has values of "0" or "1" in its body at the intersection of those indices reflecting the site-specific relatedness of those indices; a value of "1" indicates that the indices are considered related for purposes of searches of the site; a value of "0" indicates that they are not related.

Thus, for example, in the illustrated table C, the value "1" in the table body at the row indexed by the row and column headings "khakis" and "slacks," respectively, indicates that, for the specific website data set 41 with dictionary C is associated, the engine 45 is to treat those terms as related; yet the value "0" in the table body at the row indexed by the row and column headings "slacks" and "shorts," respectively, indicates that engine is to treat those terms as not related. Values of the indices and body of the lookup table C can be set, in the first instance, using default values or by the owner/operator of the website with which the site-specific dictionary 46 is associated. This can be via a command-line or graphical user interface generated by curator 48 or otherwise. Following set up, those values can be set automatically or semi-automatically by curator 48, as discussed below.

Corpus lookup table H is a matrix that likewise maintains a list of searchable terms in the site data set 41 and their "related" terms. Like lookup table C, it has searchable terms of the site-specific data set 41 as its indices (e.g., its row and column headings) and has values in its body at the intersection of those indices reflecting the relatedness of the terms those indices. Unlike lookup table C, the relatedness reflected by those values in table H is not site-specific but, rather, is a relatedness of those indices in a general corpus—that is, in a larger body of works of which the data set 41 forms a part and/or from which it draws its terminology, i.e., a spoken language, a collection of publications, web pages, data sets and so forth.

Thus, by way of example, table H in some embodiments has values of "1" or "0" in its body at the intersection of indices reflecting whether ("1") or not ("0") the terms associated with those indices are synonyms (or otherwise related) in a standard language thesaurus such as, for example, *Roget's II—The New Thesaurus*, or some other well-known such reference in the relevant language. Table H or the illustrated embodiment is not populated in that manner. Rather, it has body values at each of those intersections equal to the cosine similarity (or other Euclidean distance) between vectorizations of the respective terms with which those indices are associated.

Generation of such vectorizations is within the ken of those skilled in the art employing GloVe (e.g., per Pennington, et al, "GloVe: Global Vectors for Word Representation," *The* 2014 *Conference on Empirical Methods In Natural Language Processing*, ACL 2014, ISBN 978-1-937284-96-1), Word2Vec (e.g., as per Goldberg, et al "word2vec Explained: Deriving Mikolov et al.'s Negative-Sampling Word-Embedding Method," published at arXiv:1402.3722), fastText (an open source tool from Facebook Research), or other vectorization tools available commercially and otherwise in the art, as adapted in accord with the teachings hereof, on a corpus such as that represented by (i) all Internet-accessible web pages (or a subset thereof) in the language of the data set 41 to be searched by engine 45, (ii) all web pages and/or data sets of the genre of data set 41, and (iii) otherwise.

Determination of the cosine similarity (or other Euclidean distance) between such vectorizations is within the ken of those skilled in the art using tools for such available commercially and otherwise in the art, as adapted in accord with the teachings hereof. As will be appreciated by those skilled in the art, the values of such cosine similarities (or other Euclidean distances) are not necessarily whole numbers but, instead, may be fractional values between 0 and 1, or otherwise. In the event one or more of the more indices is a multi-word term, the illustrated embodiment utilizes a methodology as described under the heading "Similarity Metrics for Vectors & Matrices" in the Appendix hereto in order to determine cosine similarity values for the body of table H.

FIG. 2 depicts, solely by way of example, and without the benefit of calculation or other determination per the techniques referred to above, values contained in table H of the type used in the illustrated embodiment for the data set 41. It includes the same terms at its indices as table C, but the values in the body of the matrix at the intersections of those indices differ from those of table C, since they pertain to relatedness as determined, e.g., by cosine similarity of GloVe vectorizations of those terms in view of a general corpus such as that represented by all Internet-accessible English-language web pages.

Approximating look-up table G is a matrix generated by applying a transformation function to table H, a transformation function that fits table H to table C. Like lookup tables C and H, table G has searchable terms of the site-specific data set 41 as its indices (e.g., its row and column headings) and has values in its body at the intersection of those indices reflecting the relatedness of the terms represented by those indices. The relatedness reflected by those values represents application of the transformation function to values at corresponding (or other) indices of table H. Although in some embodiments, the transformation function provides a perfect fit and results in a table G that precisely matches table C, in other embodiments the transformation results in only an approximation. This is illustrated, by way of example, and without the benefit of calculation or other determination, in FIG. 2.

A technique for determination of the aforementioned transformation function is provided in the Appendix hereto under the heading "Learning the Transformation to the Second Vectorization". In that discussion the term "First Vectorization" refers to the GloVe, Word2Vec, fastText, or other such vectorization techniques discussed above (called F in the Appendix), and the term "Second Vectorization" refers to the output of the transformation function as obtained by the diagonalization procedure on look-up table G discussed above. In the discussion under that heading, table G is referred to as matrix F'.

Operation

Figure 3:
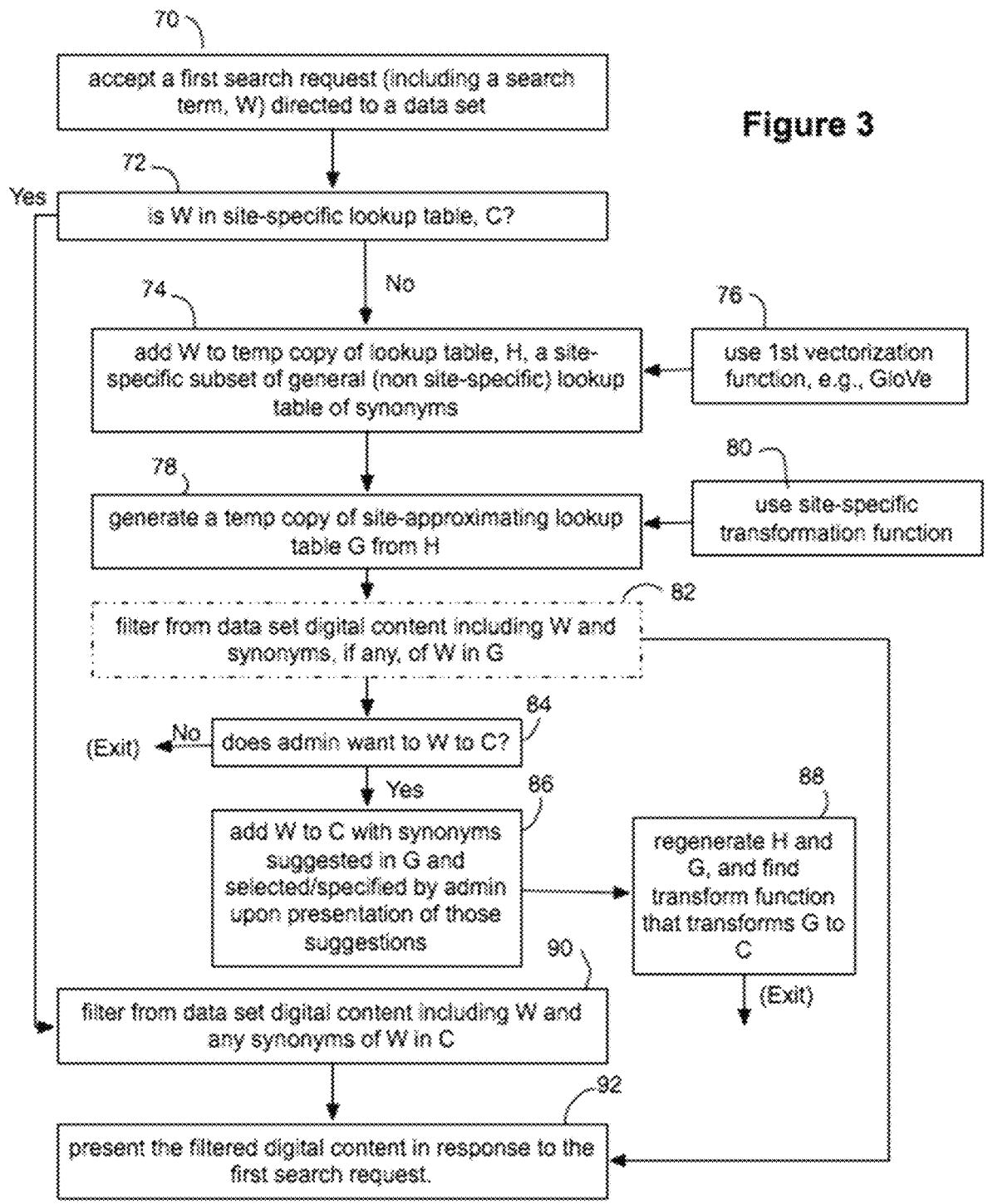
FIG. 3 depicts operation of an embodiment shown in FIG. 1.

FIG. 3 depicts operation of server 12 and, more particularly, search engine 45 and curator 48 in response to a search request directed to site-specific data set 41. See, illustrated step 70. Such requests can be received, for example, from web application 31 (and, more generally, web server 30), e.g., in response to requests received from browser 44 for searching site-specific data set 41, at a user's request or otherwise, all per convention in the art as adapted in accord with the teachings hereof.

In step 72, the search engine determines whether a search term, W, in the search request is in site specific lookup table C. This can be accomplished in a conventional manner of lookup table access known in the art, e.g., by finding W among the indices (e.g., row/column headings) of C, as adapted in accord with the teachings hereof.

If so, flow passes to step 90, where the search engine 45 identifies in lookup table C terms related to W. This can be done, for example, by identifying values (e.g., 1's) in the body of C that indicate relatedness. If/when such terms are found, the search engine 45 can use them, as well as W itself, in searching the data set 41 for "hits" and filtering the results for return to the requestor, all in the conventional manner of the art as adapted in accord with the teachings hereof. This can include, for example, returning those results to browser 44 for presentation to the user thereof, again, in the conventional manner of the art as adapted in accord with the teachings hereof. See step 92.

If W is not found in C in step 72, flow passes to step 74, where the search engine 45, working through curator 48 or otherwise, adds W to a temporary copy of table H. This includes not only adding W as an index of that temporary table, but also adding values in the body of the table at that index reflecting the relatedness per the corpus of the other terms in the table per the discussion above. This can include using a vectorization tool, such as GloVe or otherwise, consistent with the discussion above. See step 76. Creation of such a temporary table and addition of W to it, as discussed herein, is within the ken of those skilled in the art in view of the teachings hereof.

In step 78, the search engine 45, working through curator 48 or otherwise, generates a temporary copy of approximating lookup table G from the temporary copy of H. This can be done in the manner discussed above (and in the appendix) using the aforementioned transformation function and is within the ken of those skilled in the art in view of the teachings hereof. See step 80.

In some embodiments, the search engine 45 performs optional step 82. This includes using the temporary G to identify terms apparently related to W. This can be done, for example, by identifying values in the body of temporary table G that are at a row or column indexed by W and that are above a threshold value (e.g., a value of 0.6, by way of nonliving example, in an embodiment wherein relatedness values in G range from 0 to 1). If such apparently related terms are found, the search engine 45 can use them, as well as W itself, in searching the data set 41 for "hits" and filtering the results for return to the requestor, all in the conventional manner of the art as adapted in accord with the teachings hereof. This can include, for example, returning those results to browser 44 for presentation to the user thereof, again, in the conventional manner of the art as adapted in accord with the teachings hereof. See step 92.

In step 84, the curator 48 queries an owner/operator (e.g., the owner/operator of the website being searched) whether he/she wishes to add W to the C, e.g., to facilitate further searches. This can be done by presenting the owner/operator, via a graphical user interface on browser 44 or otherwise, with W and with terms apparently related to it, as determined above or otherwise and as reflected, for example, in the log file 62. See step 86. Depending on the owner/operator's response, the curator 48 can modify C to add W (and any other terms specified by the owner/operator) as indices of C and to denote related terms by placing 1's at the respective intersections of those indices in the body of C.

In step 88, the curator regenerates tables F and G in accord with table C, as updated per step 86 and stores them to the dictionary 46. Generation of the tables F and G is within the ken of those skilled in the art in view of the discussion herein, e.g., in connection with FIG. 2 and the appendices hereof.

Alternate Embodiment

Figure 4:
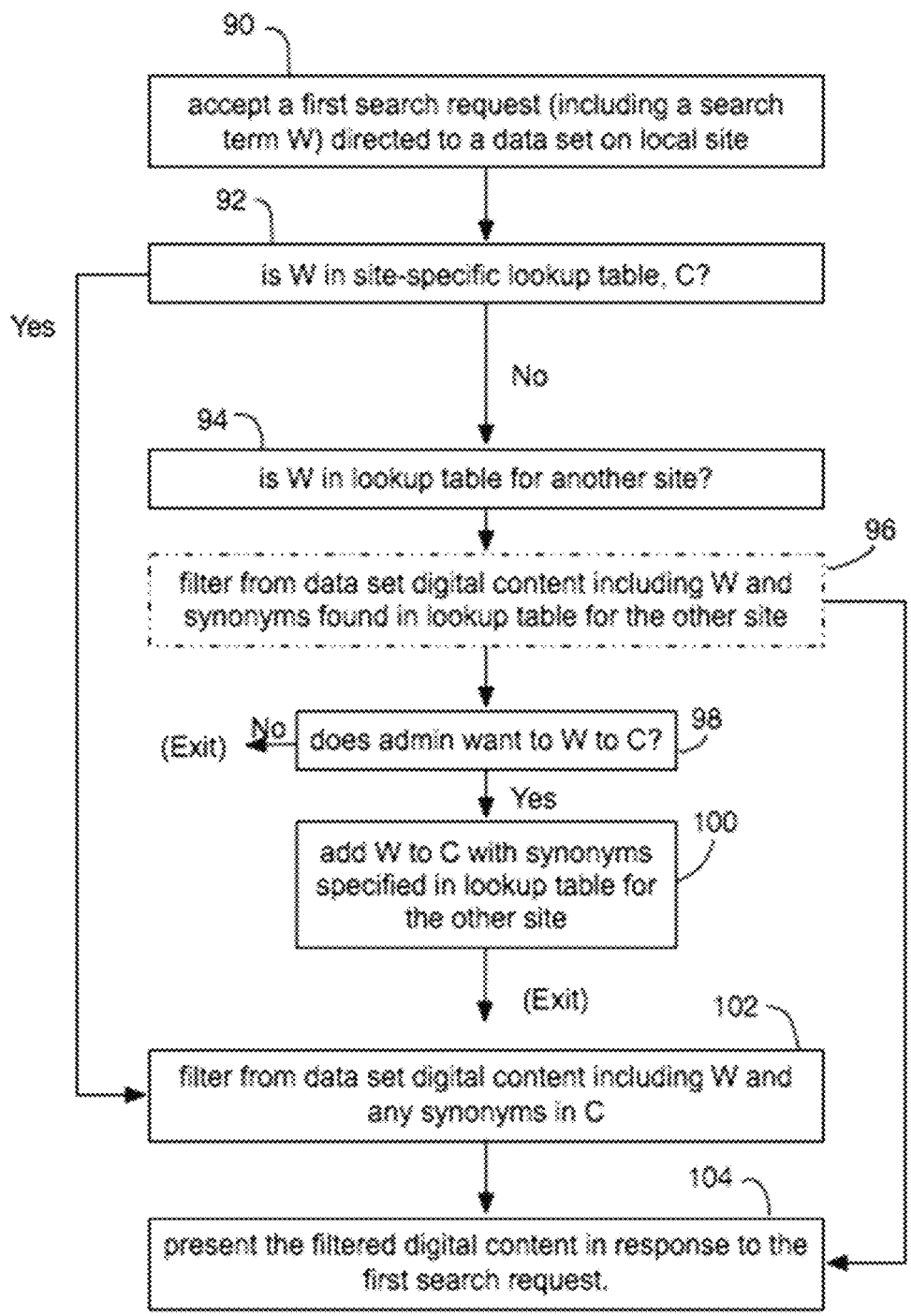
FIG. 4 depicts further operation of an embodiment shown in FIG. 1.

FIG. 4 depicts operation of server 12 and, more particularly, the search engine 45 and curator 48 in response to a search request directed to site-specific data set 41 in an alternate embodiment. See, illustrated step 90. Such requests can be received, for example, from web application 31 (and, more generally, web server 30), e.g., in response to requests transmitted from browser 44 for searching site-specific data set 41, at a user's request or otherwise, all per convention in the art as adapted in accord with the teachings hereof.

In step 92, the search engine determines whether a search term, W, in the search request is in site specific lookup table C. This can be accomplished in a conventional manner of lookup table access known in the art, e.g., by finding W among the indices (e.g., row/column headings) of C, as adapted in accord with the teachings hereof. If so, flow passes to step 102, where the search engine 45 identifies in lookup table C terms related to W. This can be done, for example, by identifying values (e.g., 1's) in the body of C that indicate relatedness. If/when such terms are found, the search engine 45 can use them, as well as W itself, in searching the data set 41 for "hits" and filtering the results for return to the requestor, all in the conventional manner of the art as adapted in accord with the teachings hereof. This can include, for example, returning those results to browser 44 for presentation to the user thereof, again, in the conventional manner of the art as adapted in accord with the teachings hereof. See step 104.

If W is not found in table C in step 92, flow passes to step 94, where the search engine 45, working through curator 48 or otherwise, searches the site-specific lookup tables and/or dictionaries associated with other websites. This is facilitated by the database server or other functionality in the data layer of embodiments that have, for example, a multi-tenancy architecture, and that support multiple websites. In such embodiments, that server or other functionality can provide engine 45 access to the tables C and/or dictionaries of one or more of those other sites, esp., those that have data sets of a same genre as the data set 41 to which the requests received in step 90 was directed. This can include, for example, data sets including related product listings or other content as that of data set 41. Searches of the tables C and/or dictionaries associated with other websites, whether within multi-tenancy architectures or otherwise, is within the ken of those skilled in the art in view of the teachings hereof.

If W is found in a site-specific lookup table and/or dictionary of another website, the search engine 45 performs optional step 96. This includes using that other website's site-specific lookup table and/or dictionary to identify terms apparently related to W. If that other site-specific lookup table is configured in a manner discussed above in connection with FIG. 2, for example, that can be accomplished by identifying values (e.g., 1's) in the body of that table indicating relatedness. Regardless, if such apparently related terms are found, the search engine 45 can use them, as well as W itself, in searching the data set 41 of the site to which the request received in step 90 was directed for "hits" and filtering the results for return to the requestor, all in the conventional manner of the art as adapted in accord with the teachings hereof. This can include, for example, returning those results to browser 44 for presentation to the user thereof, again, in the conventional manner of the art as adapted in accord with the teachings hereof. See step 104.

In step 98, the curator 48 queries an owner/operator (e.g., the owner/operator of the website being searched) re whether he/she wishes to add W to the C, e.g., to facilitate further searches. This can be done by presenting the owner/operator, via a graphical user interface on browser 44 or otherwise, with W and terms apparently related to it, as determined above or otherwise. See step 86. Depending on the owner/operator's response, the curator 48 modify C to add W (and any other terms specified by him/her) as indices of C and to denote related terms by placing 1's at the respective intersections of those indices in the body of C. See, step 100.

Described above are embodiments in accord with the teachings hereof. It will be appreciated that these are examples, and that other embodiments incorporating changes to those shown and discussed herein fall within the scope of the claims below.

APPENDIX

Technical Addendum

Similarity Metrics for Vectors & Matrices Let V( ) represent a vectorization function of a word w such that it produces an M dimensional vector representation of that word A similarity metric for two such words p and q can be defined as the Cosine similarity between their vector representations $$Sim(p,q)=\cos(V(p),V(q))$$

Now if P and Q represented phrases (i.e., multiple words) rather than a single word, one common method to define similarities would be to combine or average the individual word similarities $$Sim(P,Q) = \sum_{p \in P, q \in Q} w_{pq} \cos(V(p), V(q))$$

Instead, we define a "matrix" cosine distance metric Let the phrase P be a sequence of k words $$P=\{p_1,\ldots,p_k\}$$

We construct a matrix representation of the phrase P where each row of the matrix corresponds to the vector representation of the corresponding word $$V(P) = \begin{bmatrix} V(p_1) \\ \ldots \\ V(p_k) \end{bmatrix}$$

This matrix has k rows and M columns

For two such matrices A & B, the "matrix" cosine metric is defined as $$Sim(A,B)=\mu(AA^T)^{-1/2}AB^T(BB^T)^{-1/2}\mu$$

This similarity metric gives us a number between 0 and 1

Learning the Transformation to the Second Vectorization

A key step in our process is learning how to transform the First Vectorization into the Second Vectorization. Numerically, this is achieved as follows Let U be the user defined set of synonyms, where each element of this set represents a word pair (p,q) such that p and q are synonymous. Let (i,j) be the indices of these words in the First Vectorization representation which contains N words Define a matrix C such that $$C_{ij}=1 \text{ if } (i,j) \in U / 0 \text{ otherwise}$$

We will now adjust the first Vectorization represented by the matrix F such that it is better aligned with the ground truth represented by C Step 1.
1. Diagonalize C such that $C=Q\wedge Q^T$
2. Zero out all but the first k elements of $\wedge$, denote this matrix by $\wedge'$
3. Let v be the permutation that sorts $\wedge'$ in descending order. Transpose the columns of Q accordingly by setting $Q \leftarrow Qv$ and re-compute $C=Q\wedge'Q^T$ Step 2.
1. Let F be the First Vectorization matrix for the words that are part of C above. Compute $H=FF^T$
2. Let D be a diagonal of H
3. Adjust $H \leftarrow D^{-1/2}HD^{-1/2}$ Step 3.
1. Pick parameters $0<\lambda<1$ and $0<l\leq k$
2. Set $C \leftarrow C+\lambda H$
3. Compute adjusted Second Vectorization (N×l)matrix $F'=F'(\lambda,l)$ by diagonalizing $C=Q_1 \wedge Q_1^T$ in such a way that the entries of $\wedge$ are sorted in descending order and $F'=Q_1 \wedge [0 \ldots 1]^{1/2}$

The invention claimed is:

1. A method of filtering content from a data set, comprising executing on a digital data processing system steps of:
accepting a search request directed to a data set associated with a site, the search request including a search term that is not among terms represented in a site-specific lookup table representing site-specific relatedness of terms in that data set, such related terms including any of synonyms, hypernyms and hyponyms, generating an approximating lookup table by applying a transformation function to a corpus lookup table, the corpus lookup table representing a degree of relatedness, in a general corpus, of terms in the data set based on a cosine similarity or a Euclidian distance of vectorizations of the terms in the data set, identifying terms represented in the approximating lookup table that are related terms of the search term, filtering from the data set digital content that includes any of the search term and the terms identified from the approximating table as related terms of the search term.

2. A method for use in filtering content from a data set, comprising executing on a digital data processing system steps of:

accepting a search request directed to a data set associated with a site, the search request including a search term that is not among terms represented in a site-specific lookup table representing site-specific relatedness of terms in that data set, such related terms including any of synonyms, hypernyms and hyponyms, generating an approximating lookup table by applying a transformation function to a corpus lookup table, the corpus lookup table representing a degree of relatedness, in a general corpus, of terms in the data set based upon a cosine similarity or a Euclidian distance of vectorizations of the terms in the data set, identifying terms represented in the approximating lookup table that are related terms of the search term, modifying the site-specific lookup table to include the search term and to denote it as related with other terms represented in that table, the denotation being based on a selection from among terms identified from the approximating lookup table as being related with the search term.

3. The method of claim 2, comprising a step of generating the transformation function by fitting the approximating lookup table to the site-specific table following the modifying step.

4. The method of claim 2, comprising a step of filtering from the data set digital content that includes any of the search term and the terms identified from the approximating table as related terms of the search term.

5. The method of claim 2, the modifying step including generating the site-specific lookup table as a matrix having terms in the data set as indices and having values at intersections of those indices representing the relatedness of terms at those indices.

6. The method of claim 2, further comprising generating the corpus lookup table as a matrix having terms as indices and having values representing a degree of relatedness of vectorizations of terms at those indices.

7. The method of claim 6, the corpus lookup table-generating step including determining as a degree of relatedness between multiword terms a cosine metric that is a function of a matrix representation of each term.

8. The method of claim 7, the corpus lookup table-generating step including determining the cosine metric as a function of a pair of matrices, each representing a respective term and each having either rows or columns representing a vectorization of successive words in that term.

9. The method of claim 2, further comprising generating the approximating lookup table as a matrix having terms from the data set as indices and having values at those indices resulting from application of the transformation function to the corpus lookup table.

10. The method of claim 2, comprising a step of identifying terms represented in the approximating lookup table that are related terms of the search term.

11. The method of claim 2, comprising presenting for selection as related terms for the site terms identified as related terms of the search term in the identifying step.

12. A non-transitory machine-readable storage medium having stored thereon a computer program configured to cause a digital data device to perform the steps of:

accepting a search request directed to a data set associated with a site, the search request including a search term that is not among terms represented in a site-specific lookup table representing site-specific relatedness of terms in that data set, such related terms including any of synonyms, hypernyms and hyponyms, generating an approximating lookup table by applying a transformation function to a corpus lookup table, the corpus lookup table representing a degree of relatedness, in a general corpus, of terms in the data set based upon a cosine similarity or a Euclidian distance of vectorizations of the terms in the data set, identifying terms represented in the approximating lookup table that are related terms of the search term, filtering from the data set digital content that includes any of the search term and the terms identified from the approximating table as related terms of the search term.

13. Computer instructions configured to cause a digital data processing system to perform the steps of:

a processor;

accepting a search request directed to a data set associated with a site, the search request including a search term that is not among terms represented in a site-specific lookup table representing site-specific relatedness of terms in that data set, such related terms including any of synonyms, hypernyms and hyponyms, generating an approximating lookup table by applying a transformation function to a corpus lookup table, the corpus lookup table representing a degree of relatedness, in a general corpus, of terms in the data set based upon a cosine similarity or a Euclidian distance of vectorizations of the terms in the data set, identifying terms represented in the approximating lookup table that are related terms of the search term, filtering from the data set digital content that includes any of the search term and the terms identified from the approximating table as related terms of the search term.

* * * * *